Figures 1, 2, 3, 4:
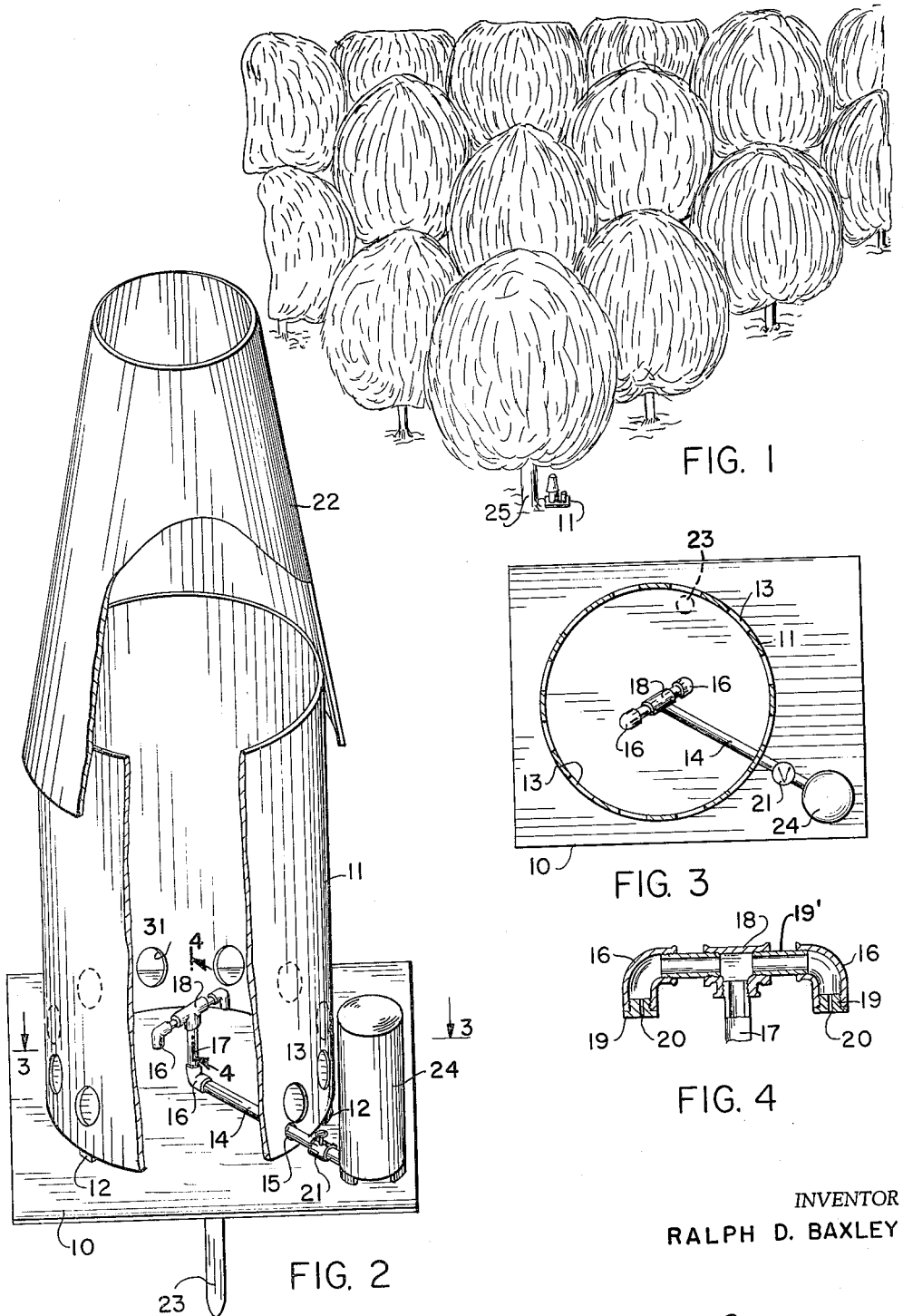

Sept. 14, 1965  R. D. BAXLEY  3,205,885
UNDER TREE HEATER
Filed Jan. 21, 1964

INVENTOR
RALPH D. BAXLEY

# United States Patent Office 3,205,885
Patented Sept. 14, 1965

3,205,885
UNDER TREE HEATER
Ralph D. Baxley, Main St., Weirsdale, Fla.
Filed Jan. 21, 1964, Ser. No. 339,208
3 Claims. (Cl. 126—59.5)

This invention relates to the growth and care of crops of various kinds in temperate climates including citrus, and to the supplying of heat on infrequent occasions when temperatures drop, to prevent freezing and damage to the plants and to the fruit.

The invention relates specifically to heaters suitable for use in groves of citrus or other trees which cannot survive freezing temperatures for supplying heat sufficient to maintain temperatures above that sufficient to freeze and to kill or cause substantial damage to the plants and fruit.

In areas where the weather is generally mild and where citrus and other crops are krown, the crops mature and are harvested provided there is no prolonged low temperature, but sometimes there occurs a more or less hard freeze, killing the plants and the fruit. Such occasions appear to have increased somewhat in frequency and substantial time and effort have been given to trying to solve this problem of loss of plants and fruit by freezing, including by the placing of heaters at spaced locations over the area desired to be protected. Heat has been produced by burning various substances, including the carcasses of worn out runbber tires, as well as by burning fluid fuels, and attempts also have been made to prevent freezing by the use of windmills to cause air circulation. Efforts to prevent freezing of citrus and other trees and fruits have met with little success, the heaters having had substantially no effect on trees located a short distance away.

It is an object of the invention to provide the simplest, most inexpensive heater, which burns the cheapest, most readily available oil or other fluid fuel, and one of which heaters can be placed under each tree to be protected so that the foliage will function to distribute and retain the heat and prevent freezing.

Another object of the invention is to provide an under-tree heater, which burns oil supplied the inside of the device from a suitable source, and having a weighted base, an upright pipe having its lower end attached to the base with openings in the lower end of the pipe to admit oxygen-carrying air to support the flame, with the upper end of the pipe provided with a hood which reduces to half size the area of discharge of the products of combustion thus to insure the slow combustion of the fuel with increased radiation and discharge of heat with maximum efficiency.

Other objects and advantages of the invention will be apparent from the following description considered in conjunction with the accompanying drawing wherein:

FIG. 1 is a perspective illustrating one use of the invention;

FIG. 2, a perspective of the heater itself with parts broken away better to illustrate the structure;

FIG. 3, a horizontal section on the line 3—3 of FIG. 2; and,

FIG. 4, a horizontal section on the line 4—4 of FIG. 2.

Briefly stated the invention is a heater of a character to be placed in a grove directly under a tree which bears citrus or other fruit, which heater is of the simplest, most inexpensive construction for burning an inexpensive fuel such as oil, and which heater includes a base of relatively thick metal and an upstanding combustion chamber forming pipe of lighter gauge metal, such pipe having spaced openings around its lower portion for the admission of oxygen laden air, oil being supplied to the lower portion of said pipe through one or more nozzles and a hood being disposed on the upper end of said pipe, which hood tapers to an opening of half the diameter of the pipe and consequently an area one-fourth the area of the pipe so as to secure a partial accumulation of the products of combustion to effect maximum lateral radiation of the heat developed thus providing for maximum effectiveness of the heater, and due to the umbrella-like nature of the tree under which the heater is placed the entire tree will be heated to avoid freezing with consequent damage.

With continued reference to the drawing, in the manufacture of the invention a preferably rectangular, flat and impervious base plate 10 of, for example, 12 gauge metal and about 14 inches across, so that it will be relatively heavy, is provided on which is rigidly attached in contact therewith the lower end of an upright pipe 11 at right angles thereto by any desired means as, for example, by spaced welds 12. The upright pipe 11 forms a fire pot or combustion chamber for the burning of combustible matter such as oil and in order that combustion may occur spaced air inlet openings 13 are located in spaced relation above and around the lower end of the pipe 11.

The base plate is adequate in weight and size to maintain by gravity the device against upsetting by the wind, the attached pipe 11 preferably being approximately 8 inches in diameter and of 16 or a gauge lighter than the base plate 10, with the opening around the lower portion of the same approximately 1 inch in diameter, the length of the pipe 11 being approximately 16 inches.

A small amount of fuel oil, when placed in the bottom of the lower end of the pipe 11, may be readily ignited and by the supply of additional oil continuous combustion can be maintained. In order to supply such fuel and effect the continuous combustion a fuel line 44 is extended through an opening 15 in the lower end portion of the pipe 11. This fuel line extends to the center of the lower end of the pipe 11 and there is connected by an elbow 16 with an upright pipe 17, on the upper end of which is connected a T-coupling 18. Into the ends of the T-coupling 18 are threaded nipples 19' on the outer ends of which are threaded additional elbows 16, the outer or free ends of which depend and are provided with plugs 19 having orifices 20 which form downwardly facing fuel discharge spray nozzles. The flow of fuel through the fluid line from a tank 24 and through the relatively small pipe 14 and the orifices 20 may be controlled by a valve 21 so that when the pipe 14 is in communication with a tank 22 or source of fuel and the valve is open fuel will be discharged through the orifices 20 of the nozzles which are heated by the burning of the small amount of fuel oil placed in the bottom of the pipe and readily can be lighted and will burn within the combustion chamber forming pipe 11.

In order to obtain maximum lateral radiation of heat from the fuel and to retard the vertical escape of the products of combustion, a removable hood or cover 22 is provided, the diameter of the lower end of which is slightly larger than the pipe 11 so that it will fit thereover and the diameter of the upper end of the hood 22 is substantially one-half the diameter of the upper end of the pipe 11 to retain and retard vertical release of heat by reducing discharge to one-half the diameter and one-fourth the volume of the upper end of the pipe 11.

The removable hood or cover 22 may be of a length slightly greater than the length of the pipe 11 so that the overall height of the heater is approximately four times its diameter, or approximately 32 inches, but in any event the upper end will be substantially below any of the limbs or foliage of the citrus tree or other plant under which the heater is placed. Due to the umbrella like nature of the tree and the action of the heater the heat released from the heater will spread both in a generally horizontal direction as well as upwardly so that in effect the tree provides a canopy or tent-like structure for retaining the heat.

It will be apparent that an under-tree heater is provided of the simplest and most inexpensive construction, including a base of a thickness to provide adequate weight so that by gravity it will remain in place against wind or storm. In order that it may be disposed in a level position where the terrain is inclined, the base may be provided on its underside adjacent one edge with a post or stake 23 which performs, in addition to a leveling action, a stabilizing or holding action. On the base is attached the lower end of an upstanding pipe and an upper tapered outlet portion of a diameter one-half that of the pipe and consequently having one-fourth the area and capacity of the pipe, the pipe having a fuel line extending into its lower end for the supply of combustible oil or other fluid fuel and having openings spaced around its lower extremity for the admission of combustion supporting air. The fuel line terminates in discharge nozzles which may be used individually or collectively.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. An under-tree heater having a flat, impervious, multiple-sided base of sufficient weight to retain it in a fixed position on the ground under the action of gravity,
 a combustion chamber-forming cylindrical pipe with its longitudinal axis upright and at right angles to said base, and of a length greater than its diameter,
 one end of said pipe being contactingly and intimately connected to said base to provide for confining a small amount of fuel therein,
 said one end having a series of air inlet openings distributed around the lower portion of said pipe and spaced above said base,
 a fuel line extending into said lower portion of said pipe and having at least one vertically depending nozzle therein spaced above said one end of said pipe for the downward discharge and burning of fuel,
 a frusto-conical pipe having its larger end removably supported on and disposed over said combustion chamber-forming pipe,
 the upper end of said frusto-conical pipe having its upper end open for the discharge of products of combustion,
 the diameter of said discharge opening being substantially half the diameter of said combustion chamber-forming pipe and due to its reduced size causing a damming of such combustion products to effect maximum lateral radiation of heat therethrough,
 and a stake attached to said base on the under-side thereof adjacent to one side by which said base can be anchored in a stabilized level position,
 and means on said base connected with said nozzle for supplying combustible fuel into the lower portion of said combustion chamber-forming pipe for combustion therein and the production of heat.

2. An under-tree heater having a flat impervious base of sufficient weight so that it will be held in place on the ground by the action of gravity,
 a combustion chamber-forming pipe having one end thereof contactingly connected to said base,
 a series of air inlet openings distributed around said one end spaced above and near said base,
 liquid fuel burning nozzle means positioned within said pipe and in facing relation to said base,
 liquid fuel supply means on said base and including means extending within said pipe and supporting said nozzle means therein,
 a frusto-conical pipe equal at least in length to said pipe and having its larger end fitted over and removably supported on said combustion chamber-forming pipe,
 the smaller end of said frusto-conical pipe serving to restrict the discharge of the products of combustion from said combustion chamber to provide maximum lateral radiation of heat therethrough, and
 a stake attached to said base on the under-side thereof and nearer one edge than another to provide for stabilization of the heater when in contact with the ground.

3. An under-tree heater in the form of a complete unit having a flat base plate of a weight sufficient to retain it in a fixed ground-supported position under the action of gravity,
 a combustion chamber-forming pipe having one end contactingly and intimately attached to said flat base plate with its longitudinal axis upright relative to said flat base plate,
 said pipe being of a length equal to at least twice its diameter and having a series of air inlet openings distributed around the lower portion thereof and spaced sufficiently above said flat base plate to provide for confining a small amount of fuel in said pipe,
 a frusto-conical pipe having an upper end substantially smaller than its lower end and having its larger end disposed over and removably mounted on the upper end of said combustion chamber-forming pipe for restricting the discharge of the products of combustion therefrom,
 a fuel tank mounted on said flat base plate adjacent said combustion chamber-forming pipe,
 downwardly facing fuel discharge nozzle means in the lower portion of said combustion chamber-forming pipe and spaced from the bottom thereof,
 a fuel line including flow control means therefor extending from said tank leading to and supporting said fuel discharge nozzle means within said combustion chamber-forming pipe,
 and an anchoring member attached adjacent one edge of said flat base and extending downwardly therefrom for securing the latter in contact with the earth and serving also as a means for maintaining said base plate in a level position.

References Cited by the Examiner

UNITED STATES PATENTS

| 983,979 | 2/11 | Chapman. | |
| 2,050,577 | 8/36 | Littleton | 158—91 |
| 2,213,509 | 9/40 | Widman | 158—91 |

FOREIGN PATENTS

| 22,041 | 3/36 | Australia. |

FREDERICK L. MATTESON, Jr., *Primary Examiner.*

JAMES W. WESTHAVER, *Examiner.*